(12) United States Patent
Nakatani et al.

(10) Patent No.: US 9,308,459 B2
(45) Date of Patent: Apr. 12, 2016

(54) SYSTEM FOR PROVIDING COMPETITION GAME USING PLURALITY OF GAME CONTENTS, AND METHOD AND PROGRAM USING THE SYSTEM

(71) Applicant: DeNA Co., Ltd., Tokyo (JP)

(72) Inventors: Ken Nakatani, Vancouver (CA); Yuichiro Mori, Vancouver (CA)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/177,176

(22) Filed: Feb. 10, 2014

(65) Prior Publication Data

US 2014/0349722 A1    Nov. 27, 2014

(30) Foreign Application Priority Data

May 24, 2013   (JP) ................................ 2013-109808

(51) Int. Cl.
| | |
|---|---|
| A63F 13/55 | (2014.01) |
| A63F 13/58 | (2014.01) |
| A63F 13/798 | (2014.01) |
| A63F 13/828 | (2014.01) |
| A63F 13/792 | (2014.01) |

(52) U.S. Cl.
CPC ............... *A63F 13/58* (2014.09); *A63F 13/798* (2014.09); *A63F 13/828* (2014.09); *A63F 13/792* (2014.09)

(58) Field of Classification Search
CPC ... A63F 3/00028; A63F 3/00041; A63F 7/06; A63F 7/0616
USPC .................................................. 463/2, 4, 42
See application file for complete search history.

(56) References Cited

U.S. PATENT DOCUMENTS

| | | | |
|---|---|---|---|
| 6,168,519 B1 | 1/2001 | Nakagawa et al. | ............... 463/4 |
| 2006/0205462 A1* | 9/2006 | Bentz et al. | ....................... 463/2 |

(Continued)

FOREIGN PATENT DOCUMENTS

| | | |
|---|---|---|
| JP | 11-342269 | 12/1999 |
| JP | 2005-318987 | 11/2005 |

(Continued)

OTHER PUBLICATIONS

Altered Gamer, "Madden 11—Player Subbing & The Depth Chart Guide", last updated Apr. 17, 2012, retrieved on Mar. 3, 2015.*

(Continued)

*Primary Examiner* — Allen Chan
(74) *Attorney, Agent, or Firm* — Pillsbury Winthrop Shaw Pittman LLP

(57) ABSTRACT

A system according to an embodiment allows a player to easily enjoy a competition game using a plurality of game contents while feeling the playability. The system includes: a game progress control unit; an information storage unit; a first formation setting unit for setting formations used by the player and an opponent and arrangement of athlete cards to a plurality of positions constituting the formations; a first competition processing unit for performing a competition process in a first half based on the formations and information on the arranged athlete cards; a second formation setting unit for setting, after the competition process in the first half, formations to be used by the player and the opponent and the arrangement of the athlete cards; and a second competition processing unit for performing a competition process in a second half based on the set formations and the information on the arranged athlete cards.

10 Claims, 10 Drawing Sheets

(56) References Cited

U.S. PATENT DOCUMENTS

2011/0237333 A1 9/2011 Otomo et al. ............ 463/42
2014/0004947 A1 1/2014 Yamaguchi et al. ......... 463/31

FOREIGN PATENT DOCUMENTS

| JP | 2010-124906 | 6/2010 |
| JP | 2012-016616 | 1/2012 |
| JP | 4928805 | 5/2012 |
| JP | 2013-039399 | 2/2013 |

OTHER PUBLICATIONS

IGN, "Madden 2011 Screenshots, Pictures, Wallpapers—Xbox 360—IGN", retrieved on Mar. 3, 2015.*

"EA Forums", Post Titled "Hit Stick and Madden Article", dated Aug. 24, 2010, retrieved on Mar. 3, 2015.*

"Screenshots of Madden NFL 11", retrieved from "http://www.ign.com/images/games/madden-nfl-11-xbox-360-36268", retrieved on Mar. 3, 2015.*

Japanese Office Action issued on Oct. 21, 2014 in Japanese Patent Application No. 2014-151049, which is a divisional application from Japanese Patent Application No. 2013-109808, and English translation thereof.

Japanese Office Action in connection with Japanese Patent Application No. 2013-109808 mailed on Mar. 11, 2014 and English translation.

Japanese Office Action in connection with Japanese Patent Application No. 2013-109808 mailed on Apr. 30, 2014 and English translation.

Jikkyou Pawafuru Puro Yakyu 2012 Official Perfect Guide, Enterbrain, Sep. 12, 2012, First Edition, pp. 104-105.

* cited by examiner

Game Content
Management Table 52a

| Game Content ID |
| --- |
| Athlete Name |
| Team Name |
| Position |
| Ability Value |
| Physical Strength Value |
| Cost |
| Image File |
| Skill |
| Rarity Value |
| ... |

Fig. 4

Owned Game Content
Management Table 52b

| Player ID |
| --- |
| Game Content ID |
| ... |

Fig. 5

Formation Management Table 52c

| | Position Name | Game Content ID | Current Physical Strength Value | Skill Exercise Flag | ... |
|---|---|---|---|---|---|
| Offensive Position 1 | Quarterback | C0812 | 100 | 0 | ... |
| Offensive Position 2 | Running back | C0054 | 120 | 1 | ... |
| Offensive Position 3 | Tight end | C0301 | 80 | 0 | ... |
| ... | ... | ... | ... | ... | ... |
| Offensive Position 10 | Tackle | C0421 | 80 | 0 | ... |
| Offensive Position 11 | Tackle | C0219 | 100 | 0 | ... |
| Defensive Position 1 | Linebackers | C0101 | 120 | 1 | ... |
| Defensive Position 2 | Strong Safety | C0811 | 100 | 0 | ... |
| Defensive Position 3 | Free Safety | C0602 | 80 | 0 | ... |
| ... | ... | ... | ... | ... | ... |
| Defensive Position 10 | Defensive Tackle | C0067 | 100 | 0 | ... |
| Defensive Position 11 | Defensive Tackle | C0318 | 120 | 0 | ... |
| Kicker | Kicker | C0025 | 100 | 0 | ... |

Fig. 6

|  | Singleback Formation | Shotgun Formation | I - Formation | ... |
|---|---|---|---|---|
| Quarterback | 1 | 1 | 1 | ... |
| Running Back | 1 | 1 | 1 | ... |
| Full Back | 0 | 0 | 1 | ... |
| Tight Ends | 2 | 0 | 1 | ... |
| Wide Receivers | 2 | 4 | 2 | ... |
| Offensive Line (Center x1, Guards x2, Tackles x2) | 5 | 5 | 5 | ... |

| | 4-3 Formation | 3-4 Formation | Dime - Formation | ... |
|---|---|---|---|---|
| Linebackers | 3 | 4 | 1 | ... |
| Strong Safety | 1 | 1 | 1 | ... |
| Free Safety | 1 | 1 | 1 | ... |
| Cornerbacks | 2 | 2 | 4 | ... |
| Defensive Line | 4 (Defensive Ends x2, Defensive Tackle x2) | 3 (Defensive Ends x2, Nose Tackle x1) | 4 (Defensive Ends x2, Defensive Tackle x2) | ... |

|  | Offensive Position | Defensive Position |
|---|---|---|
| Matchup 1 | Quarterback | Free Safety |
| Matchup 2 | Running Back/Fullback/Tight Ends | Linebacker/Strong Safety |
| Matchup 3 | Wide Receiver | Cornerbacks |
| Matchup 4 | Offensive Line (Center/Guards/Tackles) | Defensive Line (Defensive Tackles/Defensive Ends/Nose Tackles) |

Fig. 14

SYSTEM FOR PROVIDING COMPETITION GAME USING PLURALITY OF GAME CONTENTS, AND METHOD AND PROGRAM USING THE SYSTEM

CROSS-REFERENCE TO RELATED APPLICATIONS

This application is based on and claims the benefit of priority from Japanese Patent Application Serial No. 2013-109808 (filed on May 24, 2013), the contents of which are hereby incorporated by reference in their entirety.

TECHNICAL FIELD

The present invention relates to a system, and a method and a program using the system and, in particular, to a system capable of providing a competition game wherein a first player and a second player compete with each other using a plurality of game contents, and a method and a program using the system.

BACKGROUND

Conventionally known such systems include a system wherein a sports team is organized with electronic athlete cards owned by a player, and this team can compete with another team organized by another player or a computer (see, e.g., Japanese Patent Application Publication No. 2013-39399). A competition game provided by such systems is progressed wherein the system determines the superiority between athletes for each competition in the competition game, based on ability values assigned to the electronic athlete cards (e.g., hitting power, running ability, defense skill, the speed of a pitched ball, and stamina).

SUMMARY

In such systems, if the superiority between athletes is determined in a competition simply by comparing the ability values assigned to the athlete cards, players owning more athlete cards having high ability values can play the game advantageously, whereas players owning only athlete cards having low ability values cannot sufficiently enjoy the competition game. Additionally, some of such competition games using athlete cards are automatically progressed by the system once a team is organized such that the player can easily enjoy the competition game. In this case, the player having organized the team merely watches the progress of the competition game and thus cannot sufficiently feel the playability of the game. There is a demand for a setup wherein a player can easily enjoy a competition game while sufficiently feeling playability of the competition game.

One object of the present invention is to allow a player to easily enjoy a competition game using a plurality of game contents while feeling the playability of the competition game. Other objects of the embodiments of the present invention will be apparent with reference to the entire description in this specification.

A system according to an embodiment of the present invention is a system capable of providing a competition game wherein a first player competes with a second player, the system comprising: an information storage unit configured to store at least game content information on a plurality of game contents used in the competition game; and one or more processors capable of executing a program, wherein the program comprises: a first formation setting module configured to set formations to be used by the first player and the second player in a first period of the competition game from among a plurality of formations each constituted by a plurality of positions, and arrangement of the game contents to the plurality of positions constituting the set formations; a first competition processing module configured to perform a first competition process for progressing the competition game in the first period based on the set formations used by the first player and the second player in the first period and the game content information on the game contents arranged at the plurality of positions constituting the set formations; a second formation setting module configured to set, after the first competition process, formations to be used by the first player and the second player in a second period of the competition game from among the plurality of formations, and arrangement of the game contents to the plurality of positions constituting the set formations; and a second competition processing module configured to perform a second competition process for progressing the competition game in the second period based on the set formations used by the first player and the second player in the second period and the game content information on the game contents arranged at the plurality of positions constituting the set formations.

A system according to an embodiment of the present invention is a system capable of providing a competition game wherein a first player competes with a second player, the system comprising: an information storage unit configured to store at least game content information on a plurality of game contents used in the competition game; and a first formation setting unit configured to set formations to be used by the first player and the second player in a first period of the competition game from among a plurality of formations each constituted by a plurality of positions, and arrangement of the game contents to the plurality of positions constituting the set formations; a first competition processing unit configured to perform a first competition process for progressing the competition game in the first period based on the set formations used by the first player and the second player in the first period and the game content information on the game contents arranged at the plurality of positions constituting the set formations; a second formation setting unit configured to set, after the first competition process, formations to be used by the first player and the second player in a second period of the competition game from among the plurality of formations, and arrangement of the game contents to the plurality of positions constituting the set formations; and a second competition processing unit configured to perform a second competition process for progressing the competition game in the second period based on the set formations used by the first player and the second player in the second period and the game content information on the game contents arranged at the plurality of positions constituting the set formations.

The method according to an embodiment of the present invention comprises: A method for providing a competition game wherein a first player competes with a second player, the method using a system including an information storage unit for storing information, the method comprising the steps of: storing, at least on the information storage unit, game content information on a plurality of game contents used in the competition game; setting formations to be used by the first player and the second player in a first period of the competition game from among a plurality of formations each constituted by a plurality of positions, and arrangement of the game contents to the plurality of positions constituting the set formations; performing a first competition process for progressing the competition game in the first period based on the set formations used by the first player and the second player in the first period and the game content information on the game contents arranged at the plurality of positions constituting the set formations; setting, after the first competition process, formations to be used by the first player and the second player in a second period of the competition game from among the plurality of formations, and arrangement of the game contents to the plurality of positions constituting the set formations; and performing a second competition process for progressing the competition game in the second period based on the set formations used by the first player and the second player in the second period and the game content information on the game contents arranged at the plurality of positions constituting the set formations;

A program according to an embodiment of the present invention is a program for causing a computer including an information storage unit configured to store at least game content information on a plurality of game contents used in a competition game wherein a first player competes with a second player, to function as a system capable of providing the competition game, a first formation setting module configured to set formations to be used by the first player and the second player in a first period of the competition game from among a plurality of formations each constituted by a plurality of positions, and arrangement of the game contents to the plurality of positions constituting the set formations; a first competition processing module configured to perform a first competition process for progressing the competition game in the first period based on the set formations used by the first player and the second player in the first period and the game content information on the game contents arranged at the plurality of positions constituting the set formations; a second formation setting module configured to set, after the first competition process, formations to be used by the first player and the second player in a second period of the competition game from among the plurality of formations, and arrangement of the game contents to the plurality of positions constituting the set formations; and a second competition processing module configured to perform a second competition process for progressing the competition game in the second period based on the set formations used by the first player and the second player in the second period and the game content information on the game contents arranged at the plurality of positions constituting the set formations.

Various embodiments of the present invention allow a player to easily enjoy a competition game using a plurality of game contents while feeling the playability of the competition game.

BRIEF DESCRIPTION OF THE DRAWINGS

FIG. 4 is a diagram showing an example of a game content management table according to an embodiment.

FIG. 5 is a diagram showing an example of an owned game content management table according to an embodiment.

FIG. 6 is a diagram showing an example of information managed by a formation management table according to an embodiment.

FIG. 14 is a diagram showing an example of setting of matchup according to an embodiment.

DESCRIPTION OF EXAMPLE EMBODIMENTS

Figure 1:
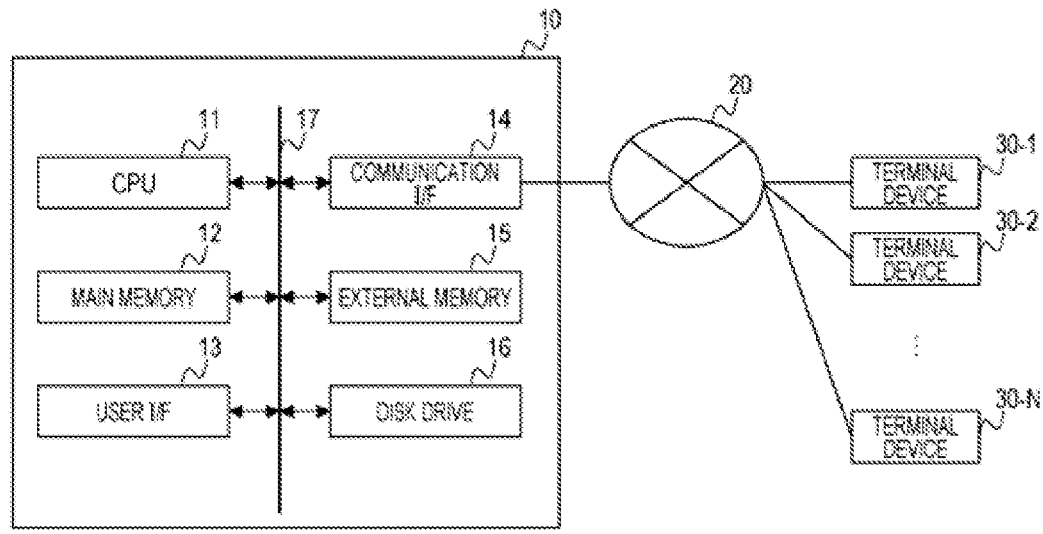
FIG. 1 is a block diagram schematically illustrating a network configuration including a system according to an embodiment of the present invention.

Various embodiments of the present invention will be described hereinafter with reference to the drawings. In the drawings, the same components are denoted by the same reference numerals.

FIG. 1 is a block diagram schematically illustrating a network configuration including a system 10 according to an embodiment of the present invention. As shown, the system 10 according to an embodiment may be communicatively connected to a plurality of terminals 30-1, 30-2, . . . , and 30-N (hereinafter also collectively referred to as the "terminals 30"), each having a communication function, via a communication network 20 such as the Internet. The system 10 may provide players operating the terminals 30 with various online games.

As illustrated in FIG. 1, the system 10 according to an embodiment may include a central processing unit (CPU) (processor) 11, a main memory 12, a user interface (I/F) 13, a communication I/F 14, an external memory 15, and a disk drive 16, and these components may be electrically connected to one another via a bus 17. The CPU 11 may load an operating system and various programs into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminals 30 via the communication network 20.

The external memory 15 may be formed of, e.g., a magnetic disk drive and store, e.g., a control program for controlling the progress of an online game. The external memory 15 may also store various data used in progress of the game. The various data that may be stored in the external memory 15 may also be stored on a database server communicatively connected to the system 10 and physically separate from the system 10. The disk drive 16 may read data stored in a storage medium such as a compact disc read only memory (CD-ROM), digital versatile disc read only memory (DVD-ROM), or DVD Recordable (DVD-R) disc, or write data to such a storage medium. For example, applications stored in a storage medium and various data for use in progress of the games may be read by the disk drive 16, and may be installed into the external memory 15.

In an embodiment, the system 10 may be a web server for managing a web site including a plurality of hierarchical web pages and may be capable of providing the terminals 30 with various online games. The terminals 30 may fetch HTML data for rendering a web page from the system 10 and analyze the fetched HTML data to present the web page to players of the terminals 30. The HTML data for rendering the web page may also be stored on the external memory 15. The HTML data may comprise HTML documents written in markup languages such as HTML; the HTML documents may be associated with various images. Additionally, the HTML documents may include programs written in script languages such as ActionScript™ and JavaScript™.

The external memory 15 may store applications to be executed on execution environments of the terminal 30 other than browser software. These applications may include programs for implementing online games and various data such as image data to be referred to for executing the programs. The programs may be created in, for example, object oriented languages such as Objective-C™ and Java™. The created programs may be stored on the external memory 15 in the form of application software along with various data. The application software stored on the external memory 15 may be delivered to a terminal 30 in response to a delivery request. The application software may not necessarily be directly delivered from the system 10 but may be delivered via another system or server communicatively connected to the system 10 and the terminal 30. The application software delivered from the system 10 may be received by the terminal 30 through a communication I/F 34 in accordance with the control of CPU 31; the received programs may be sent to an external memory 35 and stored thereon. The application software may be launched in accordance with the player's operation on the terminal 30 and may be executed on an execution environment implemented on the terminal 30 such as NgCore™ or Android™. The system 10 may provide the applications executed on the terminals 30 with various data required for progressing games. Additionally, the system 10 can store various data sent from the terminal 30 for each player, thereby managing the progress of the game for each player.

Thus, the system 10 may manage the web site for providing various online games and deliver web pages constituting the web site in response to a request from the terminal 30, thereby providing online games to a player. Also, the system 10 can provide online games based on communication with an application performed on the terminal 30 in place of, or in addition to, such browser-based online games. Whichever mode may be taken to provide the game, the system 10 can store data required to progress the online game for each identification identifying a player. Briefly, the system 10 may also include a function to authenticate a player at start of the online game and perform charging process in accordance with progress of the game. The games provided by the system 10 may include desired games such as action games, role playing games, and card games. The types of the games implemented by the web site or game applications of the system 10 are not limited to those explicitly described herein.

In an embodiment, the terminal 30 may be any information processing device that may display on a web browser a web page of a web site for online games obtained from the system 10 and include an executing environment for executing applications.

Figure 2:
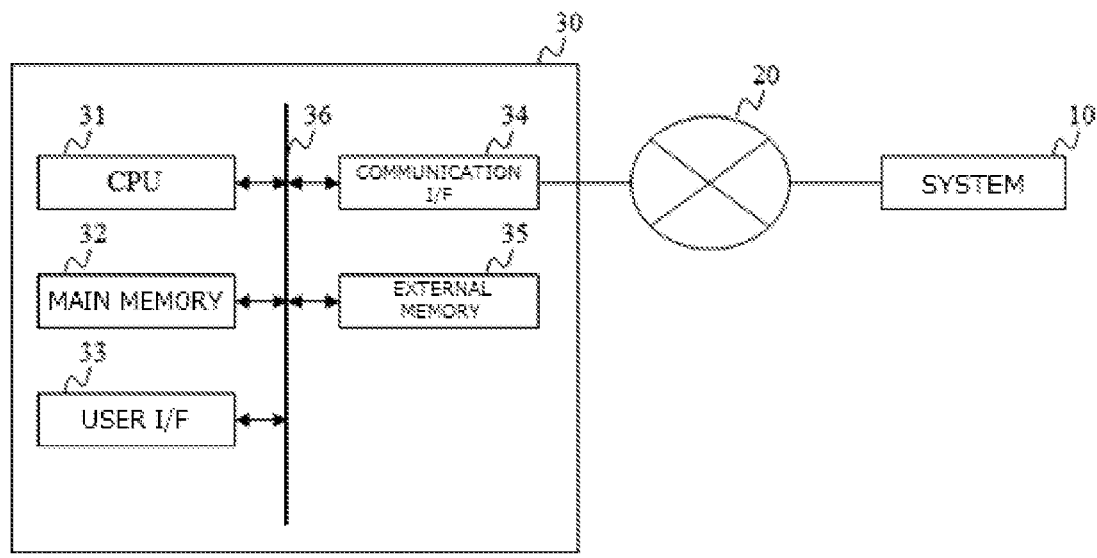
FIG. 2 is a block diagram schematically illustrating the architecture of a terminal according to an embodiment.

The architecture of the terminal 30 will now be described with reference to FIG. 2. FIG. 2 is a block diagram schematically illustrating the architecture of a terminal 30. As illustrated in FIG. 2, the terminal 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may be used to store a program to be executed by the CPU 31, and may be formed of, for example, a dynamic random access memory (DRAM).

The user I/F 33 may include, for example, an information input device such as a touch panel, a keyboard, a button, and a mouse for accepting an input from a player, and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the system 10 via the communication network 20.

The external memory 35 may comprise, for example, a magnetic disk drive or a flash memory and store various programs such as an operating system. When receiving an application from a system 10 via the communication I/F 34, the external memory 35 may store the received application.

A terminal 30 having such an architecture may include, for example, browser software for interpreting an HTML file (HTML data) and rendering a screen; this browser software may enable the terminal 30 to interpret the HTML data fetched from the system 10 and render web pages corresponding to the received HTML data. Further, the terminal 30 may include plug-in software (e.g., Flash Player distributed by Adobe Systems Incorporated) embedded into browser software; therefore, the terminal 30 can fetch from the system 10 a SWF file embedded in HTML data and execute the SWF file by using the browser software and the plug-in software.

When an online game is executed on the terminal 30, for example, animation or an operation icon designated by the program may be displayed on a screen of the terminal 30. The player may enter an instruction for causing the game to progress using an input interface of the terminal 30. The instruction entered by the player may be transmitted to the system 10 through the browser of the terminal 30 or a function of an execution environment such as NgCore™.

Figure 3:
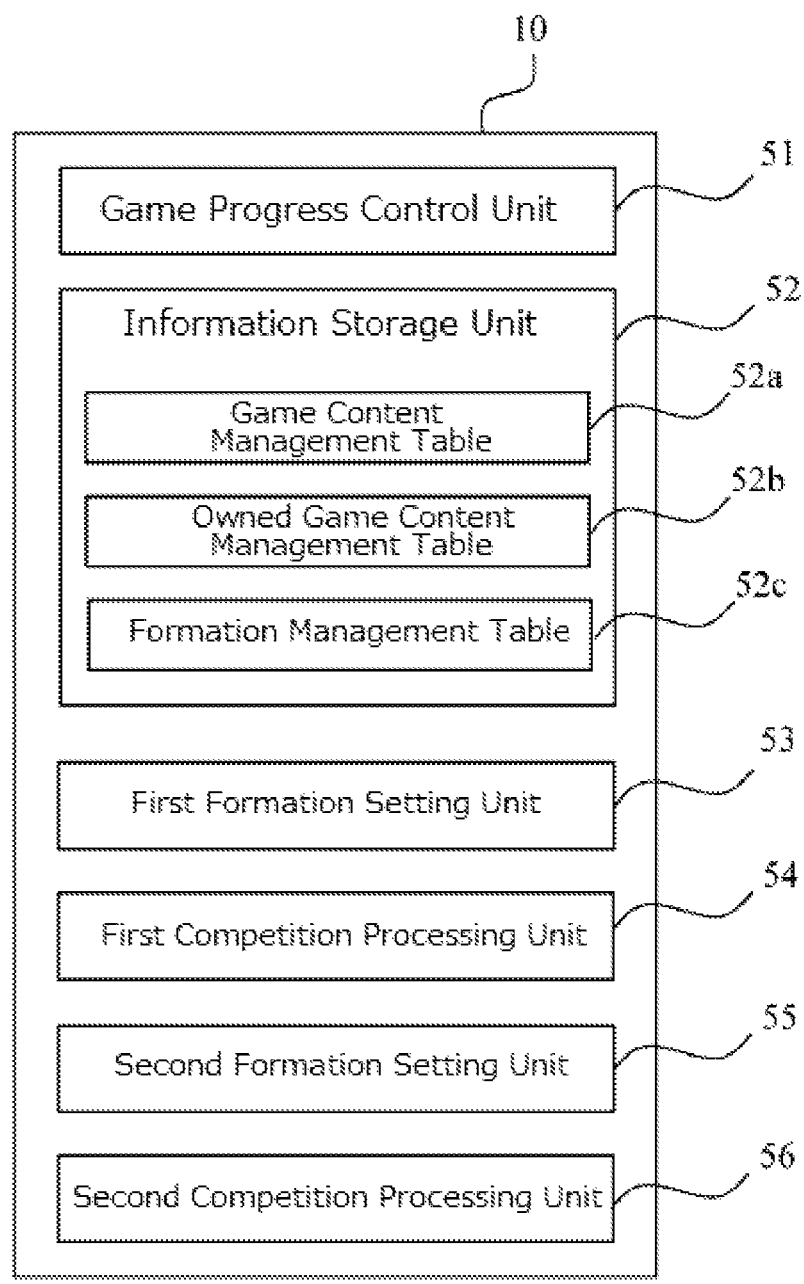
FIG. 3 is a block diagram illustrating the functionality of the system according to an embodiment.

Next, the functionality of the system 10 implemented by the components shown in FIG. 1 will now be described. As described above, the system 10, which can provide various online games, will now be described with a focus on functions related to provision of competition card games of sports (particularly, competition card games of American football). Competition card games of sports are examples suitable for description of an embodiment of the present invention. FIG. 3 is a block diagram illustrating the functionality of a system 10 according to an embodiment of the present invention. As shown, the system 10 may comprise: a game progress control unit 51 configured to control progress of an online game; an information storage unit 52 configured to store information; a first formation setting unit 53 configured to set formations to be used by the player (the first player) and the opponent (the second player) in the first half (a first period) of an American football game from among a plurality of formations each constituted by a plurality of positions, and arrangement of athlete cards (game contents) to the plurality of positions constituting the formations; a first competition processing unit 54 configured to perform a competition process (first competition process) in the first half based on the set formations used by the player and the opponent in the first half and information on the athlete cards arranged at the plurality of positions constituting the set formations; a second formation setting unit 55 configured to set, after the competition process in the first half, formations to be used by the player and the opponent in the second half (a second period) of an American football game from among a plurality of formations, and arrangement of athlete cards to the plurality of positions constituting the formations; a second competition processing unit 56 configured to perform a competition process (second competition process) in the second half based on the set formations used by the player and the opponent in the second half and information on the athlete cards arranged at the plurality of positions constituting the set formations; These functions may be implemented through cooperation between the CPU 11 of the system 10 and various programs and tables stored in the main memory 12 and the external memory 15, wherein, for example, the CPU 11 performs a program including at least part of modules corresponding to the functions of the game progress control unit 51, a first formation setting unit 53, a first competition processing unit 54, a second formation setting unit 55, and a second competition processing unit 56.

The game progress control unit 51 may send and receive various data required for the progression of the game to and from the terminal 30 and manage such data for each player, thereby controlling the progression of the game for each player. For example, the game progress control unit 51 can sequentially display, on the terminal 30, web pages constituting a web site for providing online games in response to a request from the terminal 30. When a hyperlink on the displayed web page is selected by the player, the game progress control unit 51 may send new HTML data corresponding to the hyperlink to the terminal 30. The terminal 30 may display a web page based on the new HTML data. Thus, the game progress control unit 51 may control the game such that web pages stored on the system 10 are sequentially provided to the terminal 30 in accordance with the operation by the player; and the player can progress the game by his own operation through the function of the game progress control unit 51.

When the terminal 30 executes the game application, the game progress control unit 51 can send various data used in the game to the game application. For example, when receiving from a game application on the terminal 30 a control signal indicating that a certain mission has been cleared, the game progress control unit 51 may provide the game application with various parameters related to a mission subsequent to the cleared mission. The game application may load the data provided by the system 10 and progress the game.

The terminal 30 can appropriately send to the system 10 various information on progression of the game such as information indicating various parameter values used in the game (information on earned game points and earned items) and information indicating a status (information specifying a fulfilled mission), through the function of browser software or the game application. The game progress control unit 51 may store, for each player, information on the progression of the game received from a plurality of terminals 30, thereby controlling the progression of the game for each player.

Thus, when the player logs in the system 10 using his own ID, the game may be resumed from the stage corresponding to the progression of the player (e.g., the stage where the game was interrupted) based on the information on the progression of the game associated with the player stored in the system 10. The information required for the progression of the game may also be managed by various functions of the system 10 other than the game progress control unit 51.

The information storage unit 52 may comprise: a game content management table 52a for managing information on game contents used in the competition card games; an owned game content management table 52b for managing information on game contents owned by the player; and a formation management table 52c for managing setting of formation of the player and an opponent used in the competition card game.

FIG. 4 shows an example of information managed by the game content management table 52a. As shown, the game content management table 52a may manage, in association with "game content ID" identifying a game content such as an athlete card, information such as "athlete name" indicating the name of an athlete corresponding to the athlete card, "team name" indicating the name of the team to which the athlete corresponding to the athlete card belongs in reality, "position" of the athlete card, "ability value" (second parameter) assigned to the athlete card, "physical strength value" (first parameter), "cost," "image file" specifying an image file for the athlete card, "skill" (third parameter) assigned to the athlete card, and "rarity value." The "ability value" can be increased by fusion of athlete cards (raise of level using an athlete card of another athlete) or evolution (raise of level using an athlete card of the same athlete). As will be described later, the "ability value" may decrease (vary disadvantageously to the player) when the "physical strength value" is within a predetermined range. Also, the "physical strength value" may decrease (vary disadvantageously to the player) at the end of the first half (after the competition process in the first half has been performed) in accordance with a predetermined rule. Further, the "skill" is a parameter that may be previously assigned to athlete cards having a high "rarity value" or newly assigned to athlete cards upon raise of level through fusion or evolution. As will be described later, the "skill" is a parameter specifying a special event generated by athlete cards in accordance with predetermined event generation rules in the competition card games. The game content management table 52a may manage other game contents such as items used in the competition card game, in addition to the athlete cards.

FIG. 5 shows an example of information managed by the owned game content management table 52b. As shown, the owned game content management table 52b may manage information such as combination of "player ID" identifying a player and "game content ID" identifying a game content such as an athlete card owned by the player. In an embodiment, when the player plays the competition card game for the first time, the system 10 may provide a plurality of athlete cards to the player; and then, the player purchases a card, exchanges cards with another player, obtain a card through a lottery (gacha), or sells a card. Every time the number of cards increases or decreases, the owned game content management table 52b may be updated.

FIG. 6 shows an example of information managed by the formation management table 52c. The formation management table 52c may manage setting of formation used by the player and the opponent in the competition card game, including: offensive positions 1 to 11 and defensive positions 1 to 11. These 22 positions may have information assigned thereto such as "position name" corresponding to a selected formation, "game content ID" identifying an athlete card positioned at the position, "current physical strength value" indicating the current physical strength value of the athlete card positioned at the position, and "skill exercise flag" indicating whether the skill assigned to the athlete card positioned at the position has been exercised in the competition card game. The example shown in FIG. 6 illustrates the setting of formation of one of the player and the opponent but actually, the setting of the formation of the other may be likewise managed.

Figure 7:
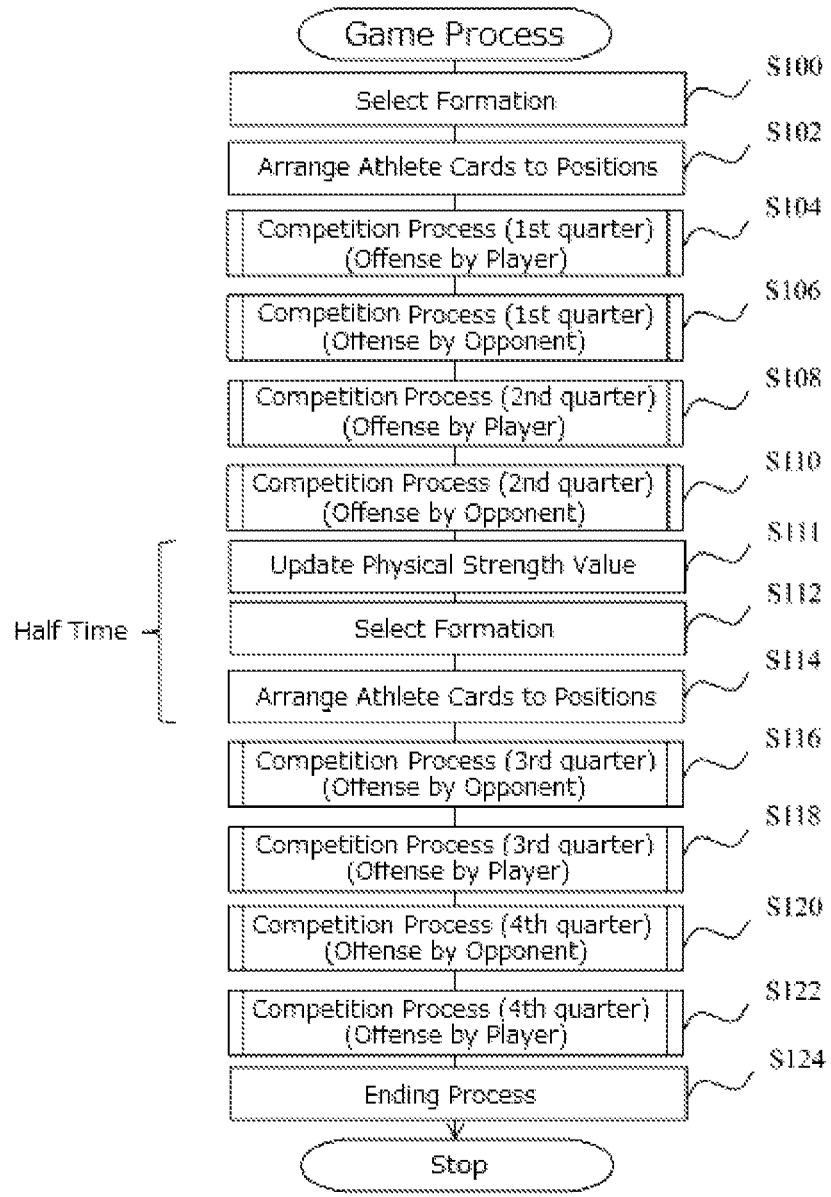
FIG. 7 is a flow diagram showing an example of a game process according to an embodiment.

Next, operations of the above system 10 as an embodiment of the present invention will now be described. FIG. 7 shows a flow diagram illustrating an example of game process performed by the system 10 providing a competition card game of American football. The game process may be performed when a player has specified an opponent via a terminal 30 and made an instruction for start of the competition card game. In an embodiment, players hoping to play a competition card game of American football may be previously signed up as players of the competition card game; and an opponent may be specified from among the plurality of players. This is not the only method of specifying an opponent in a competition card game; for example, it may also be possible that a computer (the system 10) be an opponent in the competition card game.

The overall flow of a competition card game of American football in an embodiment will now be described with reference to FIG. 7. In the competition card game of American football, the formation used in American football may be selected and athlete cards may be positioned at the positions constituting the selected formation at start of the game (steps S100 and S102) and in the half time (steps S112 and S114). The first half of the game may be performed based on the setting of the formation at start of the game, wherein, in each of the first and second quarters constituting the first half, the player first takes the offensive (steps S104 and S108) and then the opponent takes the offensive (steps S106 and S110). In contrast, the second half of the game may be performed based on the setting of the formation in the half time, wherein, in each of the third and fourth quarters constituting the second half, the opponent first takes the offensive (steps S116 and S120) and then the player takes the offensive (steps S118 and S122), contrary to the first half. Thus, both the player and the opponent can take offensive twice in each of the first and second halves, or four times in the entire competition card game.

Figures 8, 9:
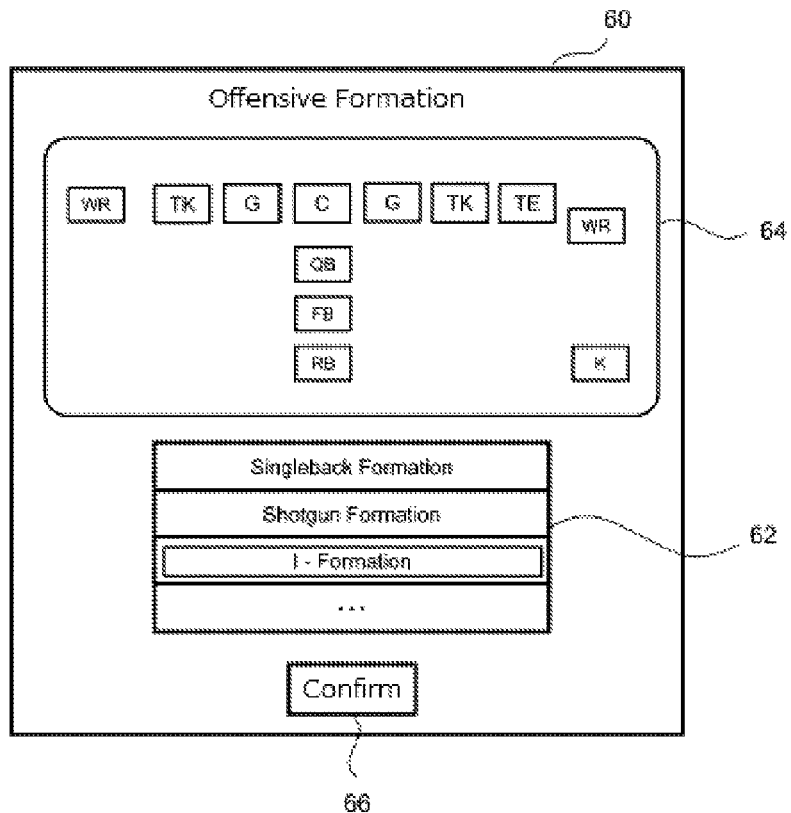
FIG. 8 is a diagram showing a display mode of a formation selection screen according to an embodiment.
FIG. 9 is a diagram showing an example of setting of offensive formation according to an embodiment.

Next, the game process shown in FIG. 7 will now be described in detail. In the game process shown, the first formation setting unit 53 may first receive selection of formation and arrangement of athlete cards at the positions, both made by the player (steps S100 and S102). FIG. 8 shows an example of formation selection screen 60 displayed on the terminal 30 for receiving selection of a formation and arrangement of the athlete cards at the positions, both made by the player. As shown, the formation selection screen 60 may comprise: a formation selection area 62 for displaying a plurality of formations selectable to the player; a position display area 64 positioned above the formation selection area 62 and displaying the layout of the positions constituting the formation selected in the formation selection area 62; and a confirmation button 66, positioned below the formation selection area 62, for the player to make an instruction for confirming the selection of the formation. The formation selection screen 60 shown in FIG. 8 is in a display mode for selecting an offensive formation among formations of American football, wherein the formation selection area 62 displays a plurality of selectable offensive formations previously defined, such as "Singleback Formation," "Shotgun Formation," and "I-Formation." When the player selects any one of the formations displayed in the formation selection area 62, the layout of the positions constituting the selected formation may be displayed in the position display area 64. FIG. 9 shows an example of an offensive formation previously defined in the system 10 in an embodiment. As shown, the plurality of offensive formations may have different number of athlete cards positioned at the positions. Each of the formations has characteristics. For example, Singleback formation balances pass plays and run plays, Shotgun formation gives priority to pass plays, and I-formation gives priority to run plays.

Figure 10:
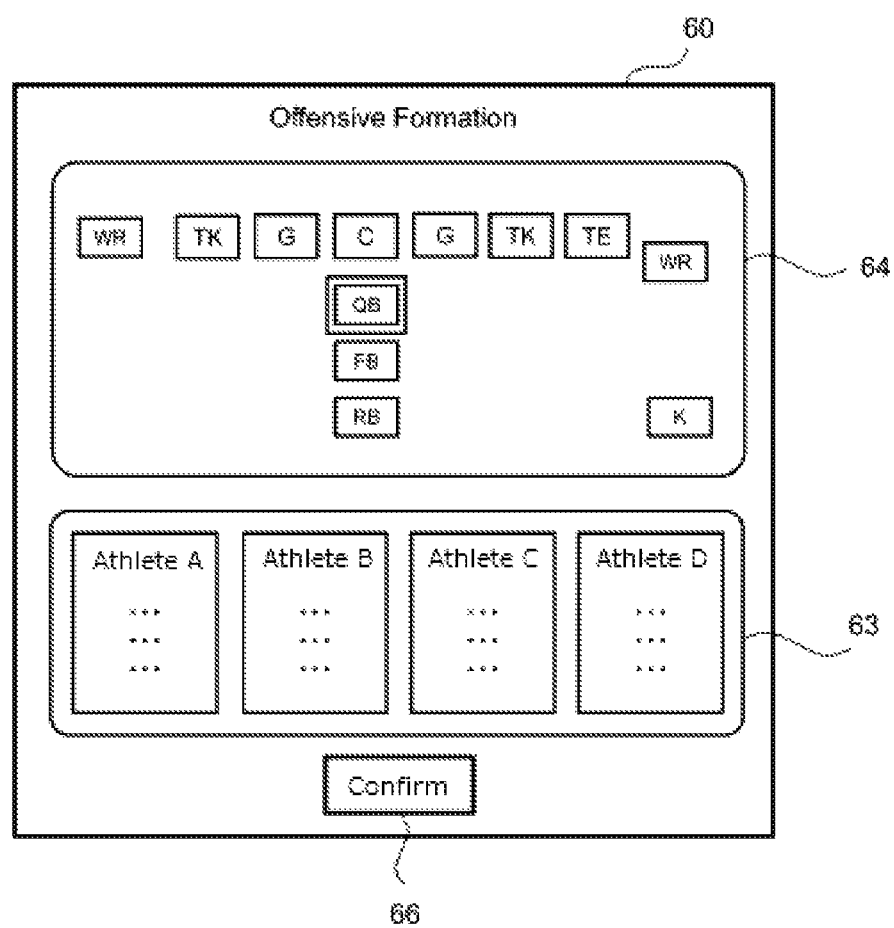
FIG. 10 is a diagram showing a display mode of a formation selection screen according to an embodiment.

In the formation selection screen 60 in a display mode for selecting an offensive formation illustrated in FIG. 8, when the player selects the confirmation button 66 with a desired formation selected in the formation selection area 62, the formation selection screen 60 may transition to a display mode shown in FIG. 10 where athlete cards are positioned at the positions constituting the selected offensive formation. In the formation selection screen 60 shown in FIG. 10, when the player selects any one of the positions in the layout displayed in the position display area 64, the athlete cards which are candidates for a card to be positioned at the selected position may be displayed in a list in the athlete card display area 63 below the position display area 64. The player can select an athlete card to be positioned at the position from among the athlete cards displayed in the list. In an embodiment, the athlete card display area 63 may display a list of athlete cards owned by the player operating the terminal 30 specified with reference to the owned game content management table 52b. When displaying a list of athlete cards owned by the player, the athlete card display area 63 may display only athlete cards that match the position selected in the position display area 64 (managed by the column "position" in the game content management table 52a).

When the player does not own an athlete card that matches the position selected in the position display area 64, the athlete card display area 63 may include athlete cards that do not match the position. When the athlete card display area 63 includes athlete cards that do not match the position, the mismatch of the position may be reflected on the "ability value" or "physical strength value" of the athlete cards (e.g. these values may be decreased at a predetermined rate). Further, when the player does not own an athlete card that matches the position selected in the position display area 64, the athlete card display area 63 may include dummy athlete cards provided by the system 10. In this case, the "ability value" and the "physical strength value" of the dummy athlete card may be lower than those of ordinary athlete cards.

It may also be possible that, when a plurality of athlete cards belonging to a same team in reality (the team can be specified by "team name" of the game content management table 52a) are positioned at positions constituting the selected offensive formation, the "ability value" and the "physical value," etc. be increased (e.g., these values may be increased at a larger rate as the number of the positioned athlete cards belonging to a same team in reality is larger).

There is an upper limit for the total of "cost" of athlete cards positioned at a plurality of positions (11 positions); and the player have to arrange athlete cards within the limit. The "cost" may be assigned to the athlete cards such that athlete cards having a higher "ability value" or "rarity value" are assigned a higher "cost." This may restrict the player from organizing an offensive formation with only athlete cards having a high "ability value" or "rarity value." The "cost" assigned to the athlete cards may be decreased in accordance with raise of the level through fusion or evolution.

Thus, the player may select the confirmation button 66 after all the positions displayed in the layout in the position display area 64 are filled with an athlete card. This may confirm the offensive formation and the arrangement of the athlete cards to the positions constituting the offensive formation. The first formation setting unit 53 of the system 10 may record corresponding information in the formation management table 52*c* specifically illustrated in FIG. 6. In the formation management table 52*c*, the "current physical strength value" may be initialized to the "physical strength value" managed by the game content management table 52*a*, and the "skill exercise flag" may be initialized to "0" (not exercised).

Figures 11, 12:
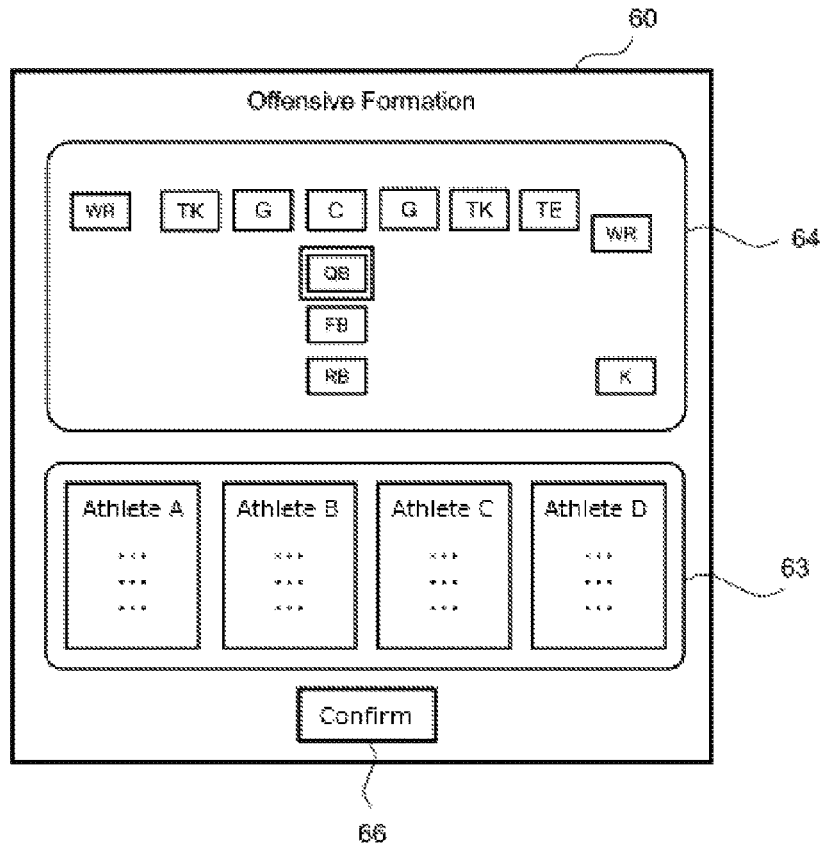
FIG. 11 is a diagram showing a display mode of a formation selection screen according to an embodiment.
FIG. 12 is a diagram showing an example of setting of defensive formation according to an embodiment.

After an offensive formation is selected via the formation selection screen 60 and the positions constituting the offensive formation are filled with athlete cards, the formation selection screen 60 may transition to a display mode for selecting a defensive formation shown in FIG. 11. As shown, the formation selection screen 60 in the display mode shown in FIG. 11 may be different from the display mode shown in FIG. 8 in that the formation selection area 62 includes selectable defensive formations such as "4-3 Formation," "3-4 Formation," and "Dime-Formation"; and in other respects, these display modes are the same. FIG. 12 shows an example of a defensive formation previously defined in the system 10 in an embodiment. As shown, the plurality of offensive formations may have different number of athlete cards positioned at the positions, as the offensive formations described above.

In the formation selection screen 60 in a display mode for selecting a defensive formation illustrated in FIG. 11, when the player selects the confirmation button 66 with a desired formation selected in the formation selection area 62, the formation selection screen 60 may transition to a display mode where athlete cards are positioned at the positions constituting the selected defensive formation, as the formation selection screen 60 shown in FIG. 10; and the player can fill the positions constituting the selected defensive formation with desired athlete cards. Thus, the player may select the confirmation button 66 after all the positions constituting the selected defensive formation are filled with an athlete card. This may confirm the defensive formation and the arrangement of the athlete cards to the positions constituting the defensive formation. The first formation setting unit 53 of the system 10 may record corresponding information in the formation management table 52*c* specifically illustrated in FIG. 6. In the formation management table 52*c*, the "current physical strength value" may be initialized to the "physical strength value" managed by the game content management table 52*a*, and the "skill exercise flag" may be initialized to "0" (not exercised), as in the case where setting of an offensive formation is recorded.

Thus, the player operation the terminal 30 can select offensive and defensive formations and fill the positions constituting the selected formations with athlete cards via the formation selection screen 60. In an embodiment, the formation of the opponent may be previously recorded on the formation management table 52*c*. That is, in the system 10, the players signed up as players of a competition card game of American football may previously set the formations (that is, select offensive and defensive formations and fill the positions constituting the selected formation with athlete cards) on the assumption that these players may be specified as an opponent of the competition card game by other players. When a player is specified as an opponent by other players and plays the competition card game, the previously set formation may be used; and when the player specifies another player as an opponent and plays the competition card game, the formations can be newly set as described above. When a player previously sets formations on the assumption that he may be specified as an opponent of the competition card game by other players, the player can use the same screen as the formation selection screen 60 described above.

Figure 13:
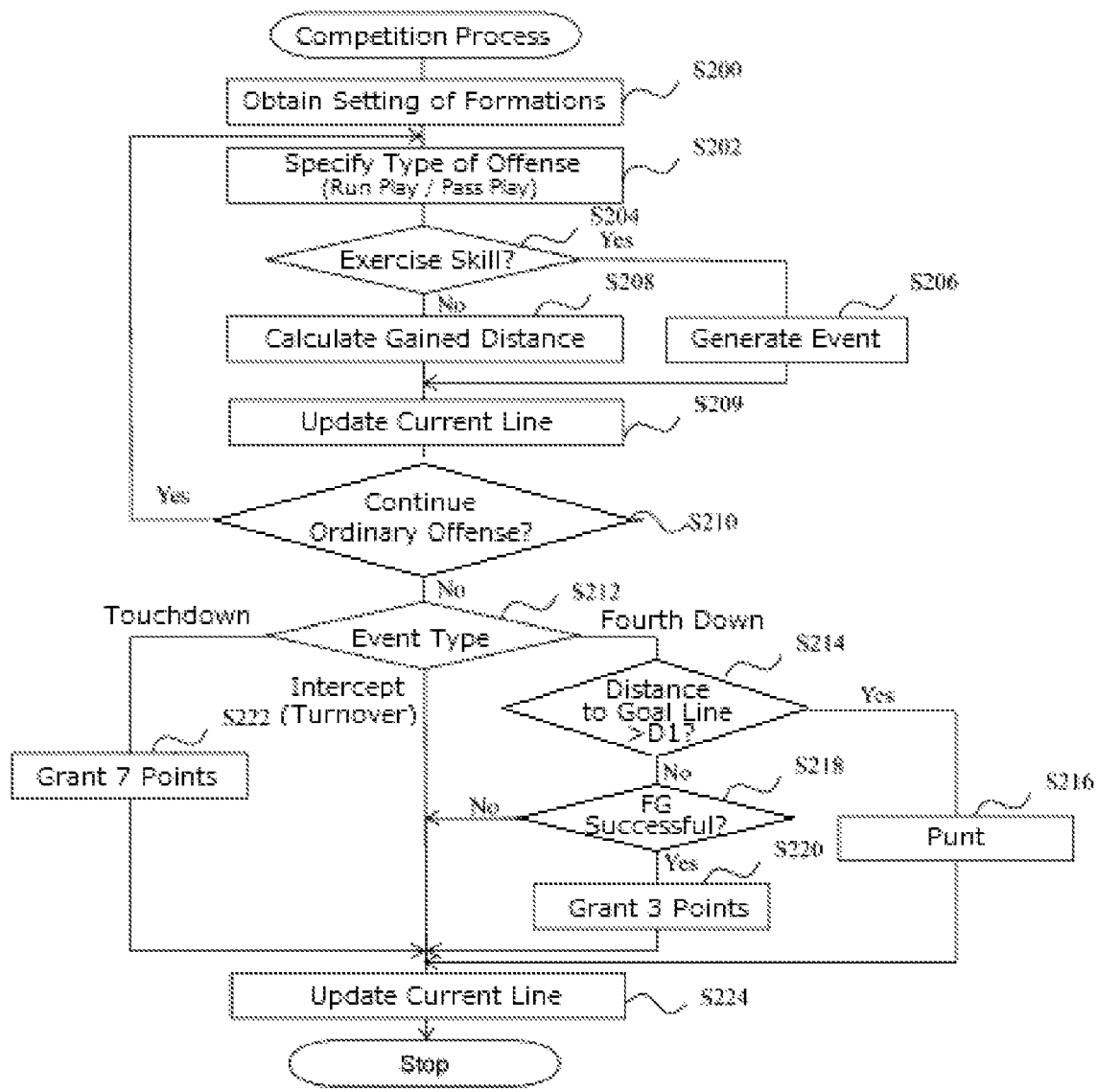
FIG. 13 is a flow diagram showing an example of a competition process according to an embodiment.

Referring back to the flow chart shown in FIG. 7, after the player selects the formations and arranges the athlete cards at the positions, the system 10 may perform a competition process in the first quarter for the player's offense (step S104). FIG. 13 is a flow diagram showing an example of the competition process. As shown, the first step in the competition process may be to obtain the setting of the formations of the player and the opponent (step S200). More specifically, the system 10 may access the formation management table 52*c* to obtain the setting of the formations of the player and the opponent.

Next, the system 10 may specify the type of offense, run play or pass play, based on the offensive formation selected by the player, the offense side (step S202). In an embodiment, the type of offense may be specified as run play or pass play in accordance with a ratio previously assigned to each offensive formation at which run play and pass play are specified. For example, an offensive formation "Singleback Formation" may be assigned a ratio of "run play:pass play=50:50," "Shotgun Formation" may be assigned a ratio of "run play:pass play=25:75," and "I-Formation" may be assigned a ratio of "run play:pass play=75:25." Thus, the type of offense may be specified as run play or pass play at a ratio according to the characteristics of the offensive formations.

After specifying the type of offense, the system 10 may determine whether to exercise the skills owned by the athlete cards (step S204) and, when it is determined to exercise the skills, the system 10 may generate events corresponding to the skills (step S206). As described above, the skills owned by the athlete cards may be managed by the game content management table 52*a*. The system 10 may determine whether to exercise the skill of each of the athlete cards arranged in the offensive formation of the player and the skills of each of the athlete cards arranged in the defensive formation of the opponent. Various methods can be used to determine whether to exercise a skill (predetermined rules for generating an event). For example, a probability of being exercised may be previously assigned to each skill to determine whether to exercise the skill. In this case, the probability may be changed in accordance with the progress of the competition card game. For example, the probability may be changed in accordance with the ordinal number of the current down (e.g., the probability may be higher for the second down than for the first down, and may be higher for the third down than for the second down); the probability may be changed in accordance with the ordinal number of the quarter (e.g., the probability may be higher for the fourth quarter than for the first quarter); the probability may be changed in accordance with the type of offense (e.g., the probability may be higher for a pass play than for a run play, or vice versa); the probability may be changed in accordance with the distance from the current line to the defensive goal line (e.g., the probability may be higher as the distance to the defensive goal line is larger); or the probability may be changed in accordance with the difference in scores between the player and the opponent (e.g., the probability may be higher as the difference in scores is larger). Thus, the skills may be exercised in accordance with the progress of the game to generate special events; therefore, for example, the player can continuously enjoy the competition card game to its end.

The events corresponding to the skills may be various. The events corresponding to the skills of the athlete cards in an offensive formation may include, for example, an event of gaining a predetermined distance (e.g., 20 yards), an event of gaining a touchdown, and an event of gaining a touchdown and two points as points after touchdown (two-point conversion). The events corresponding to the skills of the athlete cards in a defensive formation may include, for example, an event of forced transition to the status where the offense has not gained 10 yards in the third down, an event of generating an intercept (turnover), and an event of generating an intercept and gaining a predetermined distance (e.g., 20 yards). In an embodiment as described above, the formation management table 52c may manage whether to exercise the skills of the athlete cards in this game; and the skill of an athlete card which has already exercised its skill in this game may not be exercised again. That is, the maximum number of times of exercising the skill of one athlete card (the number of times of generating an event) may be limited to one throughout the first half and the second half. The maximum number of times of exercising a skill of one athlete card may be limited to two or larger.

When, as a result of determination of whether to exercise the skills of the athlete cards, it is determined to exercise the skills of a plurality of athlete cards, various methods may be used to select athlete cards for exercising the skills. For example, athlete cards having a higher "ability value" or "physical strength value" may have priority for exercising a skill. When a plurality of athlete cards having the same type of skills exercise their skills, the contents of the events corresponding to the skills may be reinforced. As examples of the same type of skills, skills of gaining a certain distance such as a skill of generating an event of gaining 20 yards and a skill of generating an event of gaining 10 yards may be reinforced to a skill of generating an event of gaining 30 yards. Further, the skills of the athlete cards in a defensive formation may include a skill of preventing an event corresponding to the skill of an athlete card in an offensive formation from being generated. For example, an athlete card in an offensive formation may have a skill of generating a touchdown, and an athlete card in a defensive formation may have a skill of preventing a touchdown. When both skills are exercised, the event of touchdown corresponding to the skill of the athlete card in the offensive formation may not be generated.

When, as a result of determination of whether to exercise skills, it is determined that no skills of the athlete cards should be exercised, the system 10 may calculate the distance gained by the player, the offense side (step S206). The gained distance can be calculated by various methods. A method of calculating the gained distance according to an embodiment will now be described in detail. First, there are matchups preset as a plurality of combinations of one or more positions constituting the offensive formation and one or more positions constituting the defensive formation. FIG. 14 shows examples of matchups. As shown, "Quarterback" constituting an offensive formation and "Free Safety" constituting a defensive formation form Matchup 1; "Running Back," "Fullback," and "Tight Ends" constituting offensive formations and "Linebacker" and "Strong Safety" constituting a defensive formation form Matchup 2; "Wide Receiver" constituting an offensive formation and "Cornerbacks" constituting a defensive formation form Matchup 3; and "Offensive Line" constituting an offensive formation and "Defensive Line" constituting a defensive formation form Matchup 4. When the type of offense selected in step S202 is run play, Matchups 1, 2, and 4 impacting on a run play may be selected; and when the type of offense selected is pass play, Matchups 1, 3, and 4 impacting on a pass play may be selected.

For each of the matchups thus selected, the following calculation may be performed based on "ability value" of the athlete cards.

(1) averaging of ability values (SO and SD)

SO is an average of ability values of athlete cards in an offensive formation.

SD is an average of ability values of athlete cards in a defensive formation.

(2) SO and SD are multiplied by a square root of the number of athletes (OM and DM).

OM is SO multiplied by a square root of the number of athlete cards in the offensive formation.

OM is SD multiplied by a square root of the number of athlete cards in the defensive formation.

(3) OM and DM are divided by the maximum value of the ability values of all the athlete cards in the matchup (AOM and ADM).

AOM is OM divided by the maximum value of the ability values of all the athlete cards in the matchup and multiplied by 100.

ADM is DM divided by the maximum value of the ability values of all the athlete cards in the matchup and multiplied by 100.

(4) ADM is subtracted from ADM (A).

A is AOM minus ADM.

In the above calculation (2), SO and DS are multiplied by a square root of the number of athletes such that more advantage is given as the number of athletes in the matchup is larger. Further, OM and DM are divided by the maximum value of the ability values of all the athlete cards in the matchup such that the value of A calculated in the calculation (4) lies within a predetermined range. The value of A may be calculated for each matchup, and the calculated values of A are totaled to determine the distance gained by the offense player. The gained distance thus calculated can be adjusted by various rules. For example, the gained distance may be increased in accordance with the distance from the current line to the defense goal line (e.g., more yards are added as the distance to the defense goal line is larger; in this case, it may also be possible that the number of yards added should be determined through a lottery with such a probability that more yards are added as the distance to the defense goal line is larger); or the gained distance may be adjusted in accordance with the type of offense (e.g., the gained distance may be adjusted such that a pass play provides larger gained distance than a run play; for example, the gained distance may be multiplied by a predetermined factor in the case of a pass play).

It may also be possible to assign a weight to each matchup and total the weighted values of A, instead of simply totaling the values of A calculated for the matchups. In this case, the weights assigned to the matchups may be varied in accordance with the combination of an offensive formation and a defensive formation.

After thus exercising skills to generate events (step S206) and calculating gained distances (step S208), the current line may be updated (step S209). For example, when, as a result of the generated events and calculation of the gained distance, the gained distance is calculated to be +5 yards, the current line may be updated to be at a position displaced toward the defense goal line by 5 yards; and when the gained distance is calculated to be −5 yards, the current line may be updated to be at a position displaced toward the offense goal line by 5 yards.

Subsequently, the system 10 may determine whether to continue the ordinary offense (step S210). In an embodiment, ordinary offense can be continued only when the following two conditions are satisfied: (1) it is the first down or the second down, or it is the third down and the total gained distance in this series has reached 10 yards; and (2) no touchdown or intercept (turnover) has been done. When both these conditions are satisfied and it is determined to continue the ordinary offense, the system 10 again specifies the type of offense, generate events in accordance with the determination of whether to exercise skills, and calculate the gained distance (steps S202 to S208). When it is the third down and the total gained distance in this series has reached 10 yards, the next down is the first down of a new series. In contrast, it is determined not to continue the ordinary offense in any of the following cases: (1) it is the third down and the total gained distance in this series is less than 10 yards; (2) a touchdown has been done; and (3) an intercept has been done (step S212).

(1) When it is the third down and the total gained distance in this series is less than 10 yards, a field goal or a punt may be selected as the fourth down in accordance with the distance from the current line to the defense goal line (step S214). More specifically, when the distance to the defense goal line is greater than a predetermined value D1 (e.g., 30 yards), a punt may be selected (step S216) and the current line may be updated (step S224). In contrast, when the distance to the defense goal line is the predetermined value D1 or smaller, a field goal (FG) may be selected, the result of the field goal may be determined (step S218), the offense player may be granted three points if the field goal is successful, but granted no points if the field goal is unsuccessful, and the current line may be updated (step S224). Various methods may be used to determine the result of the field goal. For example, when a field goal is selected, a screen for the player to select a kicker from among the athlete cards owned by the player may be displayed on the terminal 30 operated by the player to receive selection of the kicker, and the result of the field goal may be determined based on the "ability value" of the athlete card selected as a kicker by the player and the distance to the defense goal line. In this case, it may be possible that, for example, the probability of success of the field goal should be higher as the "ability value" is higher or as the distance to the defense goal line is smaller.

(2) When a touchdown has been done, the offense player may be granted seven points (six points for the touchdown plus one point as a point after touchdown) (step S222), and the current line may be updated (step S224). (3) When an intercept (turnover) has been done, no points may be granted, and the current line may be updated (step S224).

In the last step of the competition process, the current line may be updated (step S224). More specifically, the current line may be set at a predetermined line (e.g., the line positioned at 20 yards from the defense goal line) when a touchdown has been done, when a punt has been selected, or when a field goal has been successful. When an intercept has been done, the current line may be set at the line where the current line was positioned at the start of the down wherein the intercept has been done. The current line thus set may be the starting line of the next competition process.

Returning to the game process shown in FIG. 7, after the competition process of offense by the player in the first quarter is completed, the offense and the defense may be changed and a competition process of offense by the opponent in the first quarter may be performed (step S106). Since the competition process of offense by the opponent may be the same as the competition process shown in FIG. 13, the detailed description of this competition process will be omitted. After the competition process of offense by the opponent in the first quarter is completed, the competition process of offense by the player in the second quarter may be performed (step S108), and then the offense and the defense may be changed and a competition process of offense by the opponent in the second quarter may be performed (step S110). Thus, the first half is ended. In the competition process of offense by the opponent in the second quarter, it may be possible that, in step S214 (fourth down) of the flow chart shown in FIG. 13, a field goal should be always selected without the selection of a field goal or a punt in accordance with the distance from the current line to the defense goal line. This is because the starting line of the first competition process in the second half is set at a predetermined line, regardless of the current line at the end of the first half. Additionally, all of the competition processes in the first half (steps S104 to S110) may be performed by the first competition processing unit 54.

After the first half is ended, the system 10 may first update the physical strength values of athlete cards constituting the offensive and defensive formations (step S111). More specifically, the physical strength values of the athlete cards are reduced based on a predetermined rule. Various methods can be used to reduce the physical strength values. For example, the physical strength values of all the athlete cards may be reduced by a common value or a value in accordance with the number of times of being selected in matchups.

After the physical strength values are updated, the second formation setting unit 55 may receive selection of formation and arrangement of the athlete cards to the positions during the half time (step S112 and S114), as in the start of the game. Ability values may be reduced for athlete cards having a physical strength value lower than a predetermined value after the physical strength values are updated as described above (athlete cards having a physical strength value within a predetermined range). The player can replace the athlete cards having a physical strength value lower than a predetermined value with other athlete cards, or use a special item or points (value information) for increasing the physical strength values of the entire team. The predetermined value used as a threshold of the physical strength value under which the ability value may be reduced may be set based on the total of the physical strength values, etc. of the athlete cards of the opponent. For example, if the predetermined value is higher as the total of the physical strength values of the athlete cards of the opponent is higher, then the predetermined value may be higher when an athlete card having a higher physical strength value is added, and thus more athlete cards of the opponent may have ability values reduced due to reduction of their own physical strength values. Accordingly, strategic elements concerning arrangement of the athlete cards may be enhanced. The same screen as the formation selection screen 60 described above may be used to select a formation and arrange the athlete cards to the positions during the half time. Also, the formation selection screen 60 and a screen reached from the formation selection screen 60 may be used to make an instruction for using special items or points (value information) that increase the physical strength values of the entire team. The formation selection screen 60 used in the half time may be displayed such that the athlete cards having exercised a skill thereof in the first half (athlete cards having exercised a skill thereof. (generated an event) once, the upper limit) can be recognized (this is managed by the "skill exercise flag" in the formation management table 52c), or such that the athlete cards having ability values thereof reduced due to reduction of the physical strength values below the predetermined value (athlete cards having a physical strength value within a predetermined range) can be recognized (these athlete cards can be specified by "current physical strength value" in the formation management table 52c). Thus, the player can readily recognize the athlete cards that should be replaced with other athlete cards.

In an embodiment, only the player may select a formation and set (change) the arrangement of the athlete cards to the positions during the half time; and the opponent may continue to use (reuse) the formation and the arrangement of the athlete cards used in the first half. As a result, the opponent may not be required to log in to the system 10 when the competition card game is progressed. Therefore, the player can enjoy the competition card game freely. Since the opponent cannot change the setting of its formations during the half time, it may also be possible that only the player should have the physical strength values of its athlete cards updated (reduced) in step S111.

After receiving the selection of formations and the arrangement of the athlete cards to the positions, the system 10 may perform the competition processes in the third and fourth quarters in the second half of the game (steps S116 to S122). The competition processes in the third and fourth quarters may be the same as those in the first and second quarters in the first half except that the offense of the opponent is prior to that of the player. In the fourth down immediately before the end of the game (the fourth down in the competition process of offense by the player in step S122), if the offense side is 4 to 7 points behind, the ordinary offense may be continued in step S210 of the competition process shown in FIG. 13 (instead of a field goal or a punt). Additionally, all of the competition processes in the second half (steps S116 to S122) may be performed by the second competition processing unit 56.

After thus ending the competition processes of the third and fourth quarters, the system 10 may perform an ending process for ending the competition card game (step S124), and end the game process. In the ending process, the result of the competition card game may be determined based on the points granted to the player and the opponent and the terminal 30 may display an animation, etc. corresponding to the determined result. If the points granted to the player is the same as the points granted to the opponent, the game may be determined to be a draw or the game may go into extra time. If the game goes into extra time, the system 10 may perform the same process as the competition processes described above or a process simpler than the competition processes described above (e.g., simple comparison in total ability value of all the athlete cards between the offensive formation and the defensive formation). When the simple process is performed, for example, the winner may be provided with three points (corresponding to a field goal) or six points (corresponding to a touchdown) in accordance with the difference in the total ability value of all the athlete cards.

The system 10 in the embodiment as described above may set, in the first half (the first period) of the competition card game, the formations used by the player (the first player) and the opponent (the second player) and the arrangement of the athlete cards (game contents) to the positions constituting the formations; the system 10 may perform competition processes based on thus set formations to be used in the first half, the physical strength values (first parameter), the ability values (the second parameter), skills (the third parameter), etc. of the athlete cards arranged in the positions; the system 10 may reset, in the half time after the competition processes in the first half, the formations to be used in the second half (the second period) of the competition card game and the arrangement of the athlete cards to the positions constituting the formations; and the system 10 may perform competition processes based on thus set formations to be used in the second half and the physical strength values, ability values, and skills, etc. of the athlete cards arranged at the positions. Thus, the competition processes may be performed based on the formations and the ability values, the physical strength values, and the skills of the arranged athlete cards; therefore, as compared to the case where the competition processes are performed based simply on the ability values of all the athlete cards, etc., the player can feel more strategic elements on selection of formations and arrangement of athlete cards to the positions. Further, the player can change the setting of the formations in the half time in accordance with the status of the competition processes in the first half of the competition card game; therefore, the player cannot only watch the progress of the game after setting the formations and starting the competition card game, and thus the player can feel sufficient playability.

The above embodiment, which has been described in the exemplary form of a competition card game of American football, can be applied to competition card games of other sports wherein athletes are arranged at a plurality of positions constituting a formation (e.g., baseball, basketball, ice hockey, soccer, volleyball, etc.). Also, the above embodiment can be applied to competition games, other than those of sports, wherein game contents are arranged at a plurality of positions constituting a formation for competitions.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A system capable of providing a competition game wherein a first player competes with a second player, the system comprising:
   an information storage unit configured to store at least game content information on a plurality of game contents used in the competition game;
   a memory storing a program; and
   one or more processors capable of executing the program, wherein the program comprises:
   a first formation setting module configured to set athletic field formations to be used by the first player and the second player in a first period of the competition game from among a plurality of athletic field formations each constituted by a plurality of athletic field positions, and arrangement of the game contents to the plurality of positions constituting the set athletic field formations;
   a first competition processing module configured to perform a first competition process for progressing the competition game in the first period based on the set athletic field formations used by the first player and the second player in the first period and the game content information on the game contents arranged at the plurality of athletic field positions constituting the set athletic field formations;

a second formation setting module configured to set, after the first competition process, athletic field formations to be used by the first player and the second player in a second period of the competition game from among the plurality of athletic field formations, and arrangement of the game contents to the plurality of positions constituting the set athletic field formations; and a second competition processing module configured to perform a second competition process for progressing the competition game in the second period based on the set athletic field formations used by the first player and the second player in the second period and the game content information on the game contents arranged at the plurality of athletic field positions constituting the set athletic field formations, and wherein the game content information includes a first parameter, the first parameter of the game contents arranged at the plurality of athletic field positions constituting the formation used by the first player in the first period varies disadvantageously to the first player in progress of the first competition process, the first parameter of the game contents arranged at the plurality of athletic field positions constituting the formation used by the second player in the first period does not vary in progress of the first competition process, the first formation setting module receives from the first player and sets the formation and the arrangement of the game contents to be used by the first player in the first period of the competition game after the second player is specified as an opponent of the first player, and sets the formation and the arrangement of the game contents to be used by the second player in the first period based on the formation and the arrangement of the game contents previously set by the second player before the second player is specified as an opponent of the first player, and the second formation setting module receives from the first player and sets the formation and the arrangement of the game contents to be used by the first player in the second period of the competition game, sets the formation and the arrangement of the game contents to be used by the second player in the second period based on the formation and the arrangement of the game contents used by the second player in the first period, and receives, in response to an instruction from the first player, value information from the first player for varying the first parameter of the game contents used by the first player advantageously to the first player to vary the first parameter of the game contents advantageously to the first player.

2. The system of claim 1 wherein
the game content information includes a second parameter
the first competition process and the second competition process are performed based on the athletic field formations used by the first player and the second player and at least the second parameter of the game contents arranged at the plurality of athletic field positions constituting the athletic field formations,
the second parameter of the game contents used by the first player varies disadvantageously to the player owning the game contents when the first parameter lies within a predetermined range, and
the predetermined range is set based on the game content information of the game contents arranged at the plurality of athletic field positions constituting the athletic field formation used by the second player.

3. The system of claim 2 wherein the predetermined range is set based on a total of the first parameter of the game contents arranged at the plurality of athletic field positions constituting the athletic field formations used by the second player.

4. The system of claim 2 wherein the second formation setting module notifies the first player of the game contents capable of being arranged to the athletic field positions constituting the athletic field formations such that the first player can recognize, for each of the game contents, whether the first parameter lies within the predetermined range.

5. The system of claim 1 wherein
the game content information includes an event identifying parameter generated by the related game content in accordance with a predetermined event generation rule, and
the first competition process and the second competition process are performed based on the athletic field formations used by the first player and the second player and at least the athletic field parameter of the game contents arranged at the plurality of athletic field positions constituting the athletic field formations.

6. The system of claim 5 wherein
the predetermined event generation rule includes a rule prescribing an upper limit of the number of times of generating the event by the one game content throughout the first and second periods, and
the second formation setting module notifies the first player of the game contents capable of being arranged to the athletic field positions constituting the athletic field formations such that the first player can recognize, for each of the game contents, whether the number of times of generating the event has reached the upper limit.

7. The system of claim 1 wherein
the plurality of athletic field formations includes offensive athletic field formations and defensive athletic field formations;
the first formation setting module and the second formation setting module set the offensive athletic field formations and the arrangement of the game contents to the plurality of athletic field positions constituting the offensive athletic field formations to be used by the first player and the second player, and set the defensive athletic field formations and the arrangement of the game contents to the plurality of athletic field positions constituting the defensive athletic field formations to be used by the first player and the second player;
the first competition processing module performs the first competition process using the offensive athletic field formation of the first player and the defensive athletic field formation of the second player or the first competition process using the defensive athletic field formation of the first player and the offensive athletic field formation of the second player; and
the second competition processing module performs the second competition process using the offensive athletic field formation of the first player and the defensive athletic field formation of the second player or the second competition process using the defensive athletic field formation of the first player and the offensive athletic field formation of the second player.

8. The system of claim 7 wherein
the competition game is an American football game; and
the first competition process and the second competition process include a process of calculating a distance gained by the offense player using the offensive athletic field formation.

9. A method for providing a competition game wherein a first player competes with a second player, the method using a system including an information storage unit for storing information, the method comprising the steps of:

storing, at least on the information storage unit, game content information on a plurality of game contents used in the competition game;

setting athletic field formations to be used by the first player and the second player in a first period of the competition game from among a plurality of athletic field formations each constituted by a plurality of athletic field positions, and arrangement of the game contents to the plurality of positions constituting the set athletic field formations;

performing a first competition process for progressing the competition game in the first period based on the set athletic field formations used by the first player and the second player in the first period and the game content information on the game contents arranged at the plurality of athletic field positions constituting the set athletic field formations;

setting, after the first competition process, athletic field formations to be used by the first player and the second player in a second period of the competition game from among the plurality of athletic field formations, and arrangement of the game contents to the plurality of athletic field positions constituting the set athletic field formations; and performing a second competition process for progressing the competition game in the second period based on the set athletic field formations used by the first player and the second player in the second period and the game content information on the game contents arranged at the plurality of athletic field positions constituting the set athletic field formations, and wherein the game content information includes a first parameter, the first parameter of the game contents arranged at the plurality of athletic field positions constituting the athletic field formation used by the first player in the first period varies disadvantageously to the first player in progress of the first competition process, the first parameter of the game contents arranged at the plurality of athletic field positions constituting the athletic field formation used by the second player in the first period does not vary in progress of the first competition process, setting of the athletic field formation and the arrangement of the game contents to be used in the first period includes receiving from the first player and setting the athletic field formation and the arrangement of the game contents to be used by the first player in the first period of the competition game after the second player is specified as an opponent of the first player, and setting the athletic field formation and the arrangement of the game contents to be used by the second player in the first period based on the athletic field formation and the arrangement of the game contents previously set by the second player before the second player is specified as an opponent of the first player, and setting of the athletic field formation and the arrangement of the game contents to be used in the second period includes receiving from the first player and setting the athletic field formation and the arrangement of the game contents to be used by the first player in the second period of the competition game, setting the athletic field formation and the arrangement of the game contents to be used by the second player in the second period based on the athletic field formation and the arrangement of the game contents used by the second player in the first period, and receiving, in response to an instruction from the first player, value information from the first player for varying the first parameter of the game contents used by the first player advantageously to the first player to vary the first parameter of the game contents advantageously to the first player.

10. A non-transitory computer-readable storage medium storing a program for causing a computer including an information storage unit configured to store at least game content information on a plurality of game contents used in a competition game wherein a first player competes with a second player, to function as a system capable of providing the competition game, wherein the program comprises:

a first formation setting module configured to set athletic field formations to be used by the first player and the second player in a first period of the competition game from among a plurality of athletic field formations each constituted by a plurality of athletic field positions, and arrangement of the game contents to the plurality of athletic field positions constituting the set athletic field formations;

a first competition processing module configured to perform a first competition process for progressing the competition game in the first period based on the set athletic field formations used by the first player and the second player in the first period and the game content information on the game contents arranged at the plurality of athletic field positions constituting the set athletic field formations;

a second formation setting module configured to set, after the first competition process, athletic field formations to be used by the first player and the second player in a second period of the competition game from among the plurality of athletic field formations, and arrangement of the game contents to the plurality of athletic field positions constituting the set athletic field formations; and a second competition processing module configured to perform a second competition process for progressing the competition game in the second period based on the set athletic field formations used by the first player and the second player in the second period and the game content information on the game contents arranged at the plurality of athletic field positions constituting the set athletic field formations, and wherein the game content information includes a first parameter, the first parameter of the game contents arranged at the plurality of athletic field positions constituting the athletic field formation used by the first player in the first period varies disadvantageously to the first player in progress of the first competition process, the first parameter of the game contents arranged at the plurality of athletic field positions constituting the athletic field formation used by the second player in the first period does not vary in progress of the first competition process, the first athletic field formation setting module receives from the first player and sets the athletic field formation and the arrangement of the game contents to be used by the first player in the first period of the competition game after the second player is specified as an opponent of the first player, and sets the athletic field formation and the arrangement of the game contents to be used by the second player in the first period based on the athletic field formation and the arrangement of the game contents previously set by the second player before the second player is specified as an opponent of the first player, and the second athletic field formation setting module receives from the first player and sets the athletic field formation and the arrangement of the game contents to be used by the first player in the second period of the competition game, sets the athletic field formation and the arrangement of the game contents to be used by the second player in the second period based on the athletic field formation and the arrangement of the game contents used by the second player in the first period, and receives, in response to an instruction from the first player, value information from the first player for varying the first parameter of the game contents used by the first player advantageously to the first player to vary the first parameter of the game contents advantageously to the first player.

* * * * *